INVENTOR
JOHN D. HARMER
BY Herbert W. Arnold
ATTORNEY

INVENTOR
JOHN D. HARMER
BY Herbert W. Arnold
ATTORNEY

United States Patent Office 3,155,965
Patented Nov. 3, 1964

3,155,965
FEED-THROUGH NULLING SYSTEM
John D. Harmer, Arlington, Mass., assignor to Raytheon Company, Lexington, Mass., a corporation of Delaware
Filed Apr. 28, 1961, Ser. No. 106,391
8 Claims. (Cl. 343—5)

This invention relates to an automatic feed-through nulling system for a Doppler radar, and, more specifically, to such a system using a pair of re-entrant ferrite modulators to produce a controlled signal for nulling the feed-through or undesirable signal coupling from a transmitted to a received signal.

In a Doppler-type radar, the output signal from the transmitter is a continuous, or almost continuous, wave of energy which is changed in frequency by reflection from a moving target. This change in frequency is called the Doppler effect and is detected by continuously comparing the frequency of the incoming reflected signal with that of the outgoing transmitted signal. The resulting signal at the difference, or Doppler, frequency is then fed to a receiver. Since it is necessary for the received signal to be continuously compared with the transmitted frequency, there must of necessity be close coupling between the transmitter and the receiver. This results in a portion of the transmitted energy being fed to the receiver. This energy, regardless of how it is coupled to the receiver, is what is referred to here as the feed-through signal. Unfortunately, this feed-through signal, if not controlled, can result in saturation of the receiver and in degradation of the system's sensitivity. The result has been that Doppler radars have been limited in available output power in order to obtain a proportional reduction in feed-through signal. In addition, the modulater structure used to cancel the feed-through signal generally includes a pair of modulators, each of which includes a plurality of waveguide junctions for introducing and extracting the signals from the modulators, such as, for example, input and output waveguide tees. This structure adds to the weight, size, and mechanical complexity of the nulling system.

It is, therefore, an object of the invention to provide a structure in which a single waveguide junction performs the dual function of introducing the received signal including feed-through and extracting these signals together with the nulling signal.

In the present invention, feed-through nulling is accomplished by two ferrite modulators arranged in a re-entrant structure with received energy applied to the modulators together with a sample of the transmitted energy. The in-phase and quadrature components of the sampled transmitted energy are modulated by separate re-entrant ferrite modulators to produce a nulling signal for cancellation of excessive feed-through energy. In this system, the output power of the radar need not be limited by any necessity to reduce the feed-through signal.

The foregoing and other advantages and features of the invention will be better understood from the following description, taken in conjunction with the accompanying drawings wherein.

Figure 1:
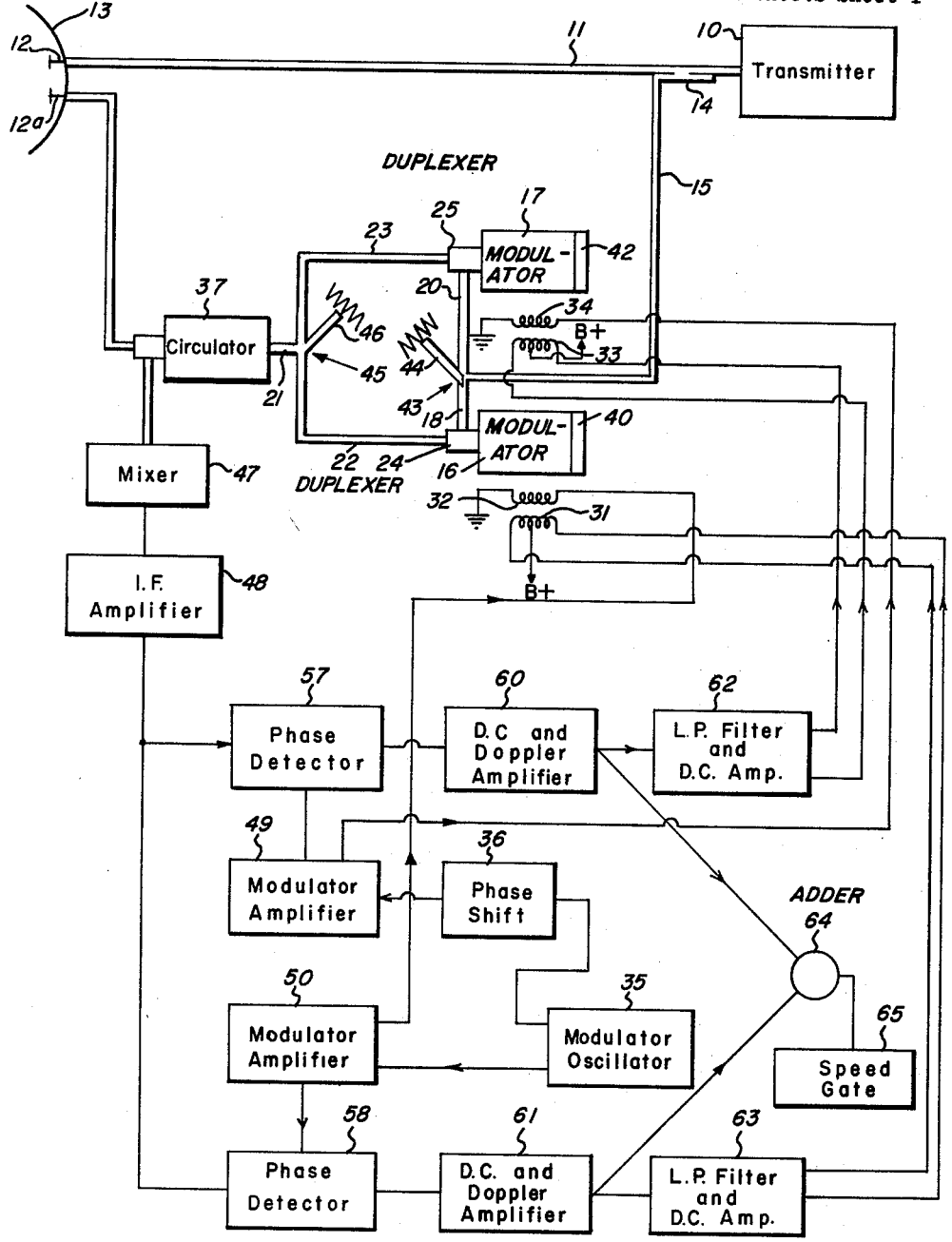
FIG. 1 is a schematic diagram of a system embodying the invention.

In FIG. 1, the reference numeral 10 designates a CW magnetron or other oscillator connected by waveguide 11 to element 12 of antenna 13. Part of the microwave energy from the magnetron 10 is connected through directional coupler 14 and waveguide 15 to the re-entrant ferrite modulators 16 and 17 by way of a magic tee 43. The balanced output arm 18 of the magic or hybrid tee 43 feeding the modulator 16 is made shorter than the balanced output arm 20 feeding the modulator 17 by a quarter wavelength at the oscillator frequency so that the oscillator energy is fed to these modulators in phase quadrature. An output arm 44 of the magic tee 43 is terminated in a matched load. Reflected energy received by antenna feed 12a from the target, shifted in frequency by the Doppler effect, is transmitted through a conventional three-port circulator 37 to the re-entrant ferrite modulators 16 and 17 through waveguide 21, magic tee 45 and balanced output arms 22 and 23 of equal length. The output arm 46 of the magic tee 45 is terminated in a matched load. The modulators 16 and 17 are provided with shorting plates 40 and 42, respectively.

Figure 2:
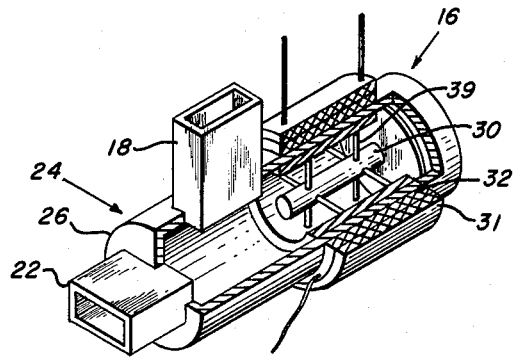
FIG. 2 is a simplified isometric drawing, partly in section, of one of the re-entrant ferrite modulators of FIG. 1.
Figure 3:
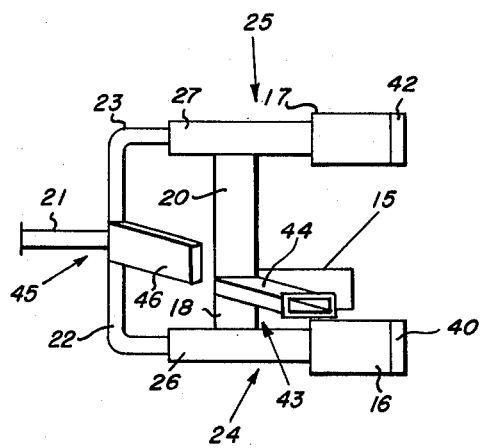
FIG. 3 is a simplified isometric drawing of the microwave circuitry of the feed-through nulling device of the system of FIG. 1.

The operation of the modulators can best be understood by reference to FIGS. 2 and 3. Signals from the oscillator 10 and the antenna element 12a are applied to the modulators 16 and 17 through duplexers 24 and 25. The devices comprise, as best seen in FIG. 3, a section of square or round waveguide 26 or 27 in which microwave energy may be propagated in two polarities at right angles to each other. The rectangular guides 18, 20, 22, and 23 are so dimensioned that energy inserted into the duplexers 24 and 25 by one guide polarized in one plane cannot be propagated in the other guide, which only propagates energy polarized in a different plane. Such duplexers are more fully illustrated in FIG. 8.45 and described on page 69 of "Microwave Duplexers" by Smullin and Montgomery, vol. 14 of the "Radiation Laboratory Series." Each of these modulators comprises a gyrator having a piece of ferrite 30 held in place by a low-loss supporting structure 39 and magnetizing coils 31 and 32, or 33 and 34, arranged about each of these waveguides in the region of the ferrite 30. One set of coils 31 and 33 are supplied with a direct current, obtained in a manner to be described, and the other set of coils 32 and 34 generate a single sideband signal by being supplied with an alternating current from a signal oscillator 35 at an intermediate frequency, for example, 30 megacycles. The current supplied to the coil 34 is shifted 90 degrees in phase by a phase shifter 36. However, it should be understood that instead of generating a single sideband signal in the modulator, a separate local oscillator feeding mixer 47 and I.-F. amplifier 48 can be used.

The duplexers 24 and 25 are so arranged that the portion of the sampled and plane of polarization rotated transmitted energy which is in phase with the sampled input energy is shunted into guides 18 and 20 and becomes dissipated in the load arm 44 of magic tee 43. On the other hand, the portion of the sampled and plane of polarization rotated transmitted energy which is in phase quadrature with the sampled input energy propagates into waveguides 22 and 23. The re-entrant ferrite modulators 16 and 17 rotate the polarization of the sampled energy. The energy in waveguides 22 and 23 is equally divided in magic tee 45, a portion being fed to circulator 37 and mixer 47, while the remaining portion of the energy is dissipated in load arm 46.

Energy entering the ferrite modulators 16 and 17 from the duplexers 24 and 25 is reflected by shorting plates 40 and 42 back through these modulators into the duplexers, thus providing double the rotation of such energy for a given magnetization of the ferrites in the modulators. This re-entrant structure permits signals being fed through the nulling modulators to be introduced and extracted by the two magic tees 43 and 45, thereby eliminating structure normally connected to the modulators in place of shorting plates 40 and 42. In addition, circulator 37 permits the received and nulling signals to be introduced into mixer 47 without loss to the received signal. For example, energy received by antenna element 12a flows through circulator 37, arms 22 and 23, and modulators 16 and 17. The received energy reflected by plates 40 and 42 returns by the same paths 22 and 23 into circulator 37 which feeds this energy into mixer 47 with substantially no signal loss. The nulling signal produced by modulation of the sampled transmitted energy is also fed through circulator 37 to mixer 47. In this manner, undesirable feed-through contained in the received signal is cancelled at the mixer 47 by appropriate magnetization of the ferrites.

The output of the mixer 47 is fed to the 30 mc. I.-F. amplifier 48 and applied to the phase detectors 57 and 58 where it is compared in phase with the amplified output of the oscillator 35, unmodified and shifted 90° in phase by phase shifter 36, respectively, to produce a direct current output if the signals are in phase. Amplifiers 49 and 50 amplify the phase-shifted and unmodified output, respectively, of oscillator 35 prior to the phase comparison in detectors 57 and 58. The direct current output of the phase detectors is amplified in D.C. amplifiers 60 and 61 and additional filters and amplifiers 62 and 63 to produce the direct current signal referred to which is applied to coils 33 and 31. When the sense of each phase component of the signal is in one direction, current flows in one section of each coil, and when the sense of each phase component of the signal is in the other direction, current flows in the other sections. When currents appear in any of the coils, 31, 32, 33, and 34, the ferrites 30 in each modulator 16 and 17 are magnetized and produce a rotation of the plane of polarization of the microwave energy propagating through them in a direction dependent upon the direction of the magnetic field produced by the current flow in the coils.

The polarization of the radio-frequency energy from the transmitter which propagates in the modulators 16 and 17 is such that, without any current flowing in the modulator coils, none of the energy will reach the mixer 47 but will be dissipated in load arm 44. When a sufficient current flows in coils 31 and 32 of the modulator 16 to rotate the polarization of the propagating energy through an angle $\theta_1$ degrees, energy is transmitted to the mixer by a factor $\sin^2 \theta_1$, and the load arm 44 by a factor $\cos^2 \theta_1$. Expressed another way, the voltage transmission factor of energy reaching the mixer is $\sin \theta_1$ which reverses in sign when $\theta_1$ reverses. The same applies to the modulator 17 which supplies radio-frequency energy in an amount determined by the polarization rotation angle $\theta_2$ of modulator 17. Thus an R.-F. signal of any phase and of an amplitude not in excess of the signal sampled from the transmitter 10 can be added to the received signal at the mixer by properly choosing $\theta_1$ and $\theta_2$.

Since the transmitted microwave signals entering via wave-guides 18 and 20 are in phase quadrature, and the 30 mc. modulating signals applied to the coils 32 and 34 are also in phase quadrature, the sum of these microwave signals at the mixer 47 is a single frequency local oscillator signal displaced 30 mc. from the microwave source frequency. This displacement is determined by the frequency of the output of the oscillator 35 which preferably should be at the highest frequency at which the modulators 16 and 17 may be made to operate efficiently.

The 30 mc. signal, as noted, is detected at the mixer 47 along with the desired received signals. It is amplified at the intermediate frequency in amplifier 48 and detected in the phase-sensitive detectors 57 and 58. These phase detectors may be of the type illustrated in FIG. 35-V and described on page 322, paragraph 30 of "The Electronic Control Handbook" by Botcher and Moulic. In particular, the output of phase detector 57 is amplified by D.-C. amplifiers 60 and 62 and the resulting D.-C. signal applied to coil 33 of the ferrite modulator 17.

In like manner, the output of phase detector 58 is amplified in D.-C. amplifiers 61 and 63, and the output applied to coil 31 of modulator 16. These D.-C. currents provide the proper amplitude and phase of radio-frequency energy to cancel out the feed-through. In effect, the phase detectors 57 and 58 produce an error signal and the D.-C. windings on the modulators close a servo loop. The output of the phase detectors and D.-C. amplifiers also contain a signal proportional to the Doppler frequency which, in the present embodiment, is coupled together through a conventional adder 64 into a speed-gate or filter circuit 65 to give the desired output signal. The time constants of the system are seleced so that the lowest Doppler frequencies of interest are not inordinately degenerated.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined by the appended claims.

What is claimed is:

1. In combination, a transmitter for producing an output signal cooperating with a receiver, means for receiving a signal derived from said output signal which contains a feed-through signal from said transmitter, means for sampling a portion of said output signal and producing a first signal in phase relationship with said output signal and a second signal in phase quadrature with said first signal, means for feeding said first signal through a first modulator and said second signal through a second modulator, said latter means including means for reflecting said first and second signals back through said first and second modulators to provide a nulling signal from the outputs of said first and second re-entrant modulators, which nulling signal is substantially equal in magnitude and opposite in phase to said feed-through signal, and means for combining said nulling signal with said feed-through signal in order to cancel said feed-through signal fed to said receiver.

2. In combination, a transmitter for producing an output signal cooperating with a receiver, means for receiving a signal derived from said output signal which contains a feed-through signal from said transmitter, means for sampling a portion of said output signal, means for producing a first signal in phase relationship with said output signal and a second signal in phase quadrature with said first signal, means for feeding said first signal through a first re-entrant modulator and said second signal through a second re-entrant modulator, means for controlling the amplitude of output of said first and second re-entrant modulators, thereby producing a nulling signal, which is equal in magnitude and opposite in phase to said feed-through signal, and means for combining said feed-through signal with the outputs of said first and second re-entrant modulators in order to cancel said feed-through signal fed to said receiver.

3. In combination, a transmitter for producing an output signal cooperating with a receiver, means for receiving a signal derived from said output signal which contains a feed-through signal from said transmitter, means for sampling a portion of said output signal and producing a first signal in phase relationship with said output signal and a second signal in phase quadrature with said first signal, means for feeding said first signal through a first modulator and said second signal through a second modulator, said latter means including means for reflecting said first and second signals back through said first and second modulators to provide a nulling signal from the outputs of said first and second re-entrant modulators, which nulling signal is substantially equal in magnitude and opposite in phase to said feed-through signal, means for determining the difference between said feed-through signal and said nulling signal to provide a correction signal, a reference signal, means responsive to said reference signal for detecting the in-phase and quadrature components of said correction signal with respect to said reference signal, and means for feeding said detected components of said correction signal to said first and second modulators to cancel said feed-through signal.

4. In combination, a transmitter for producing an output signal, means for receiving a signal derived from said output signal which contains a feed-through signal from said transmitter, means for feeding said feed-through signal to a mixer, means for sampling a portion of said output signal and producing a first signal in phase relationship with said output signal and a second signal in phase quadrature with said first signal, means for feeding said first signal to a first ferrite modulator, means for feeding said second signal to a second ferrite modulator, means for reflecting said first and second signals back through said ferrite modulators to provide first and second nulling signals, and means for feeding said nulling signals to said mixer for producing a correction signal, and means for feeding said nulling signals to first and second detectors to provide first and second control signals in phase quadrature relationship and means responsive to said first and second control signals for varying the phase and magnitude of said first and second nulling signals, thereby to cancel said feed-through signal.

5. In combination, a transmitter for producing an output signal cooperating with a receiver, means for receiving a signal derived from said output signal which contains a feed-through signal from said transmitter, means for sampling a portion of said output signal and producing a first signal in phase relationship with said output signal and a second signal in phase quadrature with said first signal, said latter means including a hybrid tee junction having a load arm adapted to dissipate portions of said first and second signals, means for feeding said first signal through a first modulator and said second signal through a second modulator, said latter means including means for reflecting said first and second signals back through said first and second modulators to provide a nulling signal from the outputs of said first and second re-entrant modulators, which nulling signal is substantially equal in magnitude and opposite in phase to said feed-through signal, and mixer means for combining said nulling signal with said feed-through signal in order to cancel said feed-through signal fed to said receiver.

6. In combination, a transmitter for producing an output signal, means for receiving a signal derived from said output signal which contains a feed-through signal from said transmitter, means for feeding said feed-through signal to a mixer, means for sampling a portion of said output signal and producing a first signal in phase relationship with said output signal and a second signal in phase quadrature with said first signal, means for feeding said first signal to a first re-entrant modulator, means for feeding said second signal to a second re-entrant modulator, means for reflecting said first and second signals back through said re-entrant modulators to provide first and second nulling signals, and means for feeding said nulling signals to said mixer for comparison of said feed-through signal with said nulling signals to provide a correction signal, first and second detector means responsive to said correction signal for producing first and second control signals, and means for feeding said control signals to said first and second modulators to control said first and second signals, thereby to cancel said feed-through signal.

7. In combination, means for producing an output signal, means for receiving a signal derived from said output signal which contains a feed-through signal, means for sampling a portion of said output signal, means for feeding a first portion of said sampled output signal to a first modulator and a second portion of said sampled output signal to a second modulator, said latter means including a hybrid tee junction having a load arm adapted to dissipate in phase components of said first and second portions of said output signal, means for reflecting said first and second portions of said output signal back through said modulators to provide a nulling signal which is equal in magnitude and opposite in phase to said feed-through signal, and means for combining said nulling signal with said feed-through signal to cancel said feed-through signal.

8. In combination, means for producing an output signal, means for receiving a signal derived from said output signal which contains a feed-through signal, means for sampling a portion of said output signal, means for feeding a first portion of said sampled output signal to a first modulator and a second portion of said sampled output signal to a second modulator, said latter means including a hybrid tee junction having a load arm adapted to dissipate in phase components of said first and second portions of said output signal, means for reflecting said first and second portions of said output signal back through said modulators, means including an additional hybrid tee junction for combining said reflected signals to provide a nulling signal, and means for combining said nulling signal with said feed-through signal to cancel said feed-through signal.

References Cited in the file of this patent

UNITED STATES PATENTS

| | | |
|---|---|---|
| 2,866,192 | Johnson et al. | Dec. 23, 1958 |
| 3,007,157 | Rosen | Oct. 31, 1961 |
| 3,021,521 | Hutchins | Feb. 13, 1962 |
| 3,029,427 | Rosen | Apr. 10, 1962 |
| 3,077,593 | Gross | Feb. 12, 1963 |